(12) United States Patent
Karaoguz et al.

(10) Patent No.: US 8,724,623 B2
(45) Date of Patent: May 13, 2014

(54) SWITCH FABRIC WITH WIRELESS INTRA-CONNECTIVITY

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 957 days.

(21) Appl. No.: 12/323,286

(22) Filed: Nov. 25, 2008

(65) Prior Publication Data

US 2010/0128682 A1 May 27, 2010

(51) Int. Cl.
*H04L 12/50* (2006.01)
*H04Q 11/04* (2006.01)

(52) U.S. Cl.
CPC .................................. *H04Q 11/04* (2013.01)
USPC ........... 370/357; 370/242; 370/244; 370/245; 370/254; 370/255; 370/367; 370/388; 370/395.21

(58) Field of Classification Search
None
See application file for complete search history.

(56) References Cited

U.S. PATENT DOCUMENTS

| | | | |
|---|---|---|---|
| 6,856,788 B2* | 2/2005 | Chang et al. ................. | 455/41.1 |
| 2003/0236890 A1* | 12/2003 | Hurwitz et al. ............... | 709/227 |
| 2005/0075080 A1 | 4/2005 | Zhang | |
| 2008/0160926 A1* | 7/2008 | Rofougaran .................... | 455/73 |

FOREIGN PATENT DOCUMENTS

EP 1940087 A2 7/2008

OTHER PUBLICATIONS

Chang et al., CMP NoC Overlaid with Multi-Band RF-Interconnect, Feb. 2008.*

European Patent Office, Communication with European Search Report, in Application No. EP09014369.4, dated May 3, 2010.
Chang, "CMP Network-On-Chip Overlaid With Multi-Band RF-Interconnect", High Performance Computer Architecture, 2008, HPCA 2008, IEEE 14th International Symposium On, IEEE, Piscataway, NJ, USA, Feb. 16, 2008, pp. 191-202, XP031353633, ISBN: 978-1-4244-2070-4.
Mau-Chung, "RF/Wireless Interconnect for Inter- and Intra-Chip Communicatios", Proceedings of the IEEE, IEEE, New York, US, vol. 89, No. 4, Apr. 1, 2001, XP011044495, ISSN: 0018-9219.
Communication from the European Patent Office in European Patent Application No. 09 014 369.4 Dated Dec. 27, 2011, 5 pages.
L. Benini, G. De Micheli, "Networks on Chips: Technology and Tools," publication No. XP040425723, 2006, 407 pages.
K. Goossens, O. Ganwal, J. Rover, A.P. Niranjan, Interconnect and Memory Organization in SoCs for Advanced Set-top Boxes and TV—Evolution, Analysis and Trends, vol. 15, 2004, pp. 499-423, retrieved from the Internet at http://www.ict.kth.se/courses/2B1457/2004-interconnectcentric-chap15.pdf.
M. Chang, et al. Network-on-Chip Overlaid With Multi-Band RF Interconnect, IEEE 14th Annual Symposium on High Performance Computer Architecture 2008, Feb. 16, 2008, pp. 191-202.

* cited by examiner

*Primary Examiner* — Faruk Hamza
*Assistant Examiner* — Aixa A Guadalupe-Cruz
(74) *Attorney, Agent, or Firm* — Brinks Gilson & Lione

(57) ABSTRACT

A plurality of wireless interfaces and/or internal radios is utilized within a network switching device to enable wireless intra-connectivity within its switch fabric. The wireless intra-connectivity services switching operations in the network switching device, to prevent and/or reduce blocking in the network switching device. The wireless intra-connectivity is also used to enable management and control operations in the network switching device. Operations of the internal radios and/or wireless interfaces are managed to mitigate and/or limit interference among the internal radios and to optimize throughput available via the wireless intra-connectivity. Arbitration, channelization, time multiplexing, and/or directionality techniques, for example, are utilized in the internal radios. External radios are operable to enable cascading plurality of network switching devices.

16 Claims, 6 Drawing Sheets

SWITCH FABRIC WITH WIRELESS INTRA-CONNECTIVITY

CROSS-REFERENCE TO RELATED APPLICATIONS/INCORPORATION BY REFERENCE

[Not Applicable].

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for a switch fabric with wireless intra-connectivity.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, personal computers (PCs) and other specialized devices including, for example, printers, audiovisual devices and other devices, are connected together as nodes in computer networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based network and utilizes various protocols comprising TCP/IP, for example, to facilitate packet switching. In this regard, data is encapsulated into packets that comprise a header portion and a payload portion to enable transporting, addressing and/or routing among various entities within or coupled to the network.

Network switching devices, comprising such devices as switches, routers and/or hubs, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Switches also comprise multiple ports, but unlike hubs, switches are more actively functional in performing routing operations. For example, switches maintain routing information that enables the switches to examine received packets and process them accordingly to determine whether the packets are transmitted via the switch, and if so, to determine the appropriate ports to perform that transmission. Switches may store, generate, and/or maintain addressing related information of accessible network nodes.

Some network switches, however, may block traffic. Blocking occurs when a switch reaches a point where it is unable to perform additional switching even though it has not reached its theoretical maximum throughput, which generally is based on the combined maximum speeds of all of its ports.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a switch fabric with wireless intra-connectivity, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for switch fabric with wireless intra-connectivity. In various embodiments of the invention, a plurality of wireless interfaces and/or internal radios is operable to enable wireless intra-connectivity within a switch fabric of a network switching device, to enable communicating information and/or data wirelessly between entities within the network switching device. The internal radios are operable to enable transmission and/or reception of RF signals of various frequencies, comprising, for example 60 GHz. The wireless intra-connectivity is utilized to service wired and/or wireless switching operations in the network switching device. For example, wireless intra-connectivity enables data switching between two or more ports in the network switching device. The wireless intra-connectivity is utilized to supplement and/or substitute for use of wired pathways during packet switching, to prevent and/or reduce blocking in the network switching device. The wireless intra-connectivity enables performing management and/or control operations wirelessly within the network switching device. Use of wireless intra-connectivity and/or wired pathways within the network switching device is based on plurality of factors comprising, for example, available communication speed, available bandwidth, and/or quality of service (QoS). The wireless interfaces and/or the internal radios utilized to enable wireless intra-connectivity are managed to mitigate and/or limit interference among one or more of the plurality of internal radios and to optimize throughput available via the wireless intra-connectivity. Management of the wireless intra-connectivity and/or the internal radios comprises, for example, utilizing arbitration, channelization, time division multiplexing, and/or directional processing techniques such as beamforming. One or more radios that are internal and/or external to the network switching device are operable to enable cascading of a plurality of network switching devices that support the wireless intra-connectivity.

Figure 1:
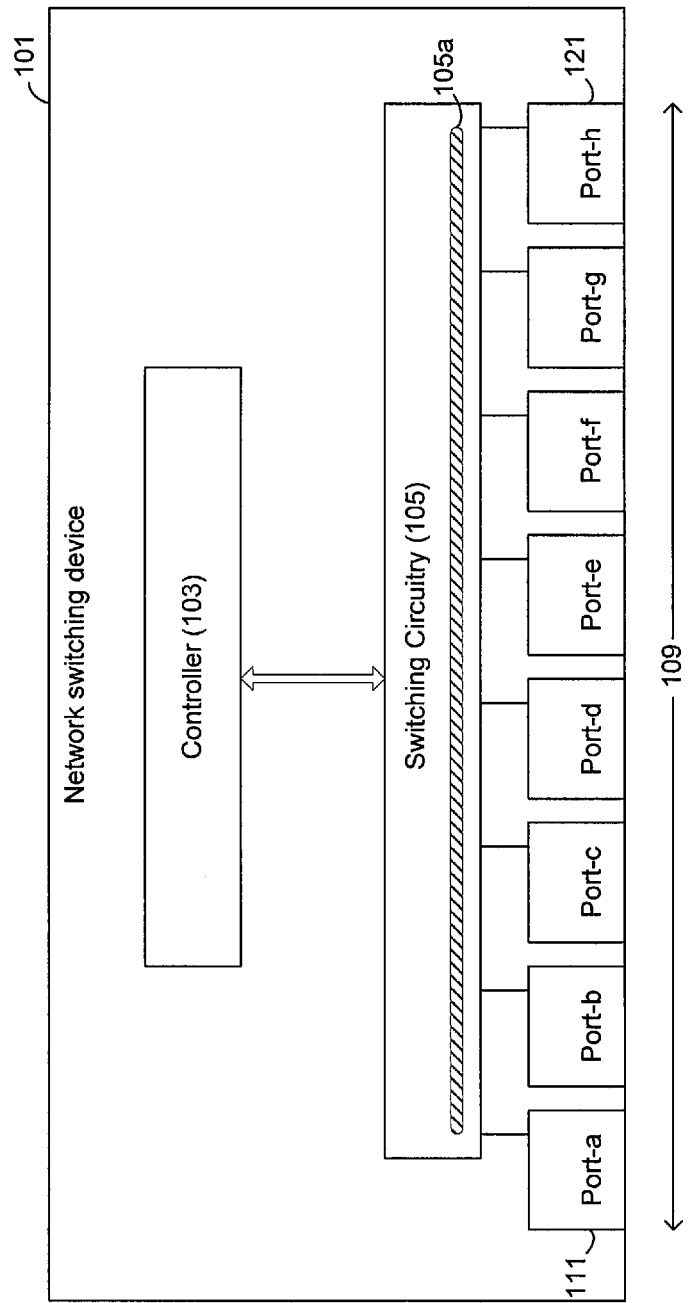
FIG. 1 is a block diagram that illustrates an exemplary network switching device with only wired based switch fabric, in connection with an embodiment of the invention.

FIG. 1 is a block diagram that illustrates an exemplary network switching device with wired based switch fabric, in connection with an embodiment of the invention. Referring to FIG. 1, there is shown a network switching device 101, a controller 103, a switching circuitry 105, and a plurality of ports 109. Each of the plurality of ports substantially similar to or the same as port-a 111.

The network switching device 101 comprises switch fabric that is operable to enable performing switching operations in a network. Exemplary network switching devices comprise routers and/or switches. Switching operations may be performed based on one or more networking layers, based on the Open Systems Interconnection (OSI) Model for example. For example, some network switching devices may be operable to perform L2 and/or L3 switching. The network switching device 101 comprises, for example, the controller 103, the switching circuitry 105, the plurality of ports 109, and suitable logic, code, and/or circuitry that enable performing various switching related operations. The network switching device 101 is operable to forward network traffic received from a network node, directly or via one or more intermediate networks and/or network nodes, via any of the plurality of ports 109, to one or more other network nodes, directly or via one or more intermediary networks, via one or more ports in the plurality of ports 109. For example, the network switching device 101 is operable to route network traffic received via port-a 111 to network nodes that may be reachable or accessible via port-h 121. The controller 103 comprises suitable logic, circuitry and/or code that enable performing control and/or management operations in the network switching device 101. The controller 103 may comprise, for example, a general purpose processer or an application-specific integrated circuit (ASIC) configurable and/or operable to provide control and/or management messaging and/or processing in the network switching device 101. The controller 103 is utilized, for example, to set up and/or manage operations of each of the ports in the plurality of ports 109, to setup, control, and/or manage operations of the switching circuitry 105, to setup, monitor, and/or manage switching paths within the network switching device 101, and/or to maintain and/or manage addressing information that are utilized during packet processing operations.

The switching circuitry 105 comprises suitable logic, circuitry and/or code that enable routing switch traffic among the plurality of ports 109 via one or more wired links. The switching circuitry 105 is utilized, for example, to enable communication of packets received in any of the plurality of ports 109, from sending network node, to one or more ports in the plurality of ports 109, to facilitate communicating of the received packets to one or more receiving network nodes. The switching circuitry 105 may comprise, for example, a bus subsystem 105a, which comprises suitable logic, circuitry, and/or code that may enable exchange of data and/or messaging among a plurality of components and/or entities via a plurality of physical interconnects, based on one or more interfaces, comprising, for example, PCI and/or $I^2C$. The busy subsystem 105a is operable in the network switching device 101 to facilitate data transfers among components of the fabric switch 101, including the plurality of ports 109.

Port-a 111 comprises suitable logic, circuitry and/or code that enable providing external network interfacing functionality, in the network switching device 101, based on one or more networking standards and/or protocols. Port-a 111 may comprise, for example, a 10/100/1000 Mbps Ethernet port or multigigabit Ethernet port.

In operation, the network switching device 101 is utilized to perform network switching operations. The network switching device 101 may be utilized, for example, in a local area network (LAN), to enable transfer of traffic packets between network nodes in the LAN. Traffic packets, for example, may be received in port-a 111 from a sending network node. The received traffic packets are then processed, via port-a 111 to determine the addressing information. For example, where the received traffic packets are TCP/IP traffic packets, the IP headers are parsed to determine the source and/or destination addressing information for the received traffic packets. Once the destination nodes are determined, based on routing tables maintained in the controller 103 for example, the corresponding port or ports that need to be utilized to transmit the received traffic packets are determined.

The network switching device 101 is operable, for example, to maintain routing information that map a set of destination addresses corresponding to network nodes to each of the ports in the plurality of ports 109. The routing information is stored, generated, and/or maintained in the network switching device 101, via the controller 103 for example. Once the appropriate port or ports are determined, port-h 121 for example, the switching circuitry 105 is utilized to transfer the traffic packets from the receiving ports to the transmitting ports. For example, where the switching circuitry 105 comprises a bus subsystem, the processed received traffic packets are transferred from and/or to the ports via bus interfaces, from port-a 111 to port-h 121 for example. Interrupts may be generated to indicate when the received traffic packets are ready for transfer by the sending port and/or ready for reception by the receiving port. The data transfer via the switching circuitry 105 is managed by internal controller logic and/or subsystem in the switching circuitry 105 and/or by the controller 103. The management of data transfer enables, for example, proper scheduling of data push/pull to ensure that the maximum bandwidth is not exceed and/or to prevent transfer bottlenecks.

In some network switching devices, for example, hardware, software and/or logic limitations in the network switching device 101 may result 'blocking.' Blocking occurs when a switch reaches a point where it is unable to perform additional switching even though it has not yet reached its theoretical maximum throughput, which generally is based on the aggregate maximum speeds of all of its ports.

In an exemplary aspect of the invention, internal radios are utilized within switch fabric to enable non-blocking switching wherein at least some of the switched traffic is communicated via the internal radios between switch ports. The internal radios may also be utilized to facilitate controlling operations within the switch fabric.

Figure 2A:
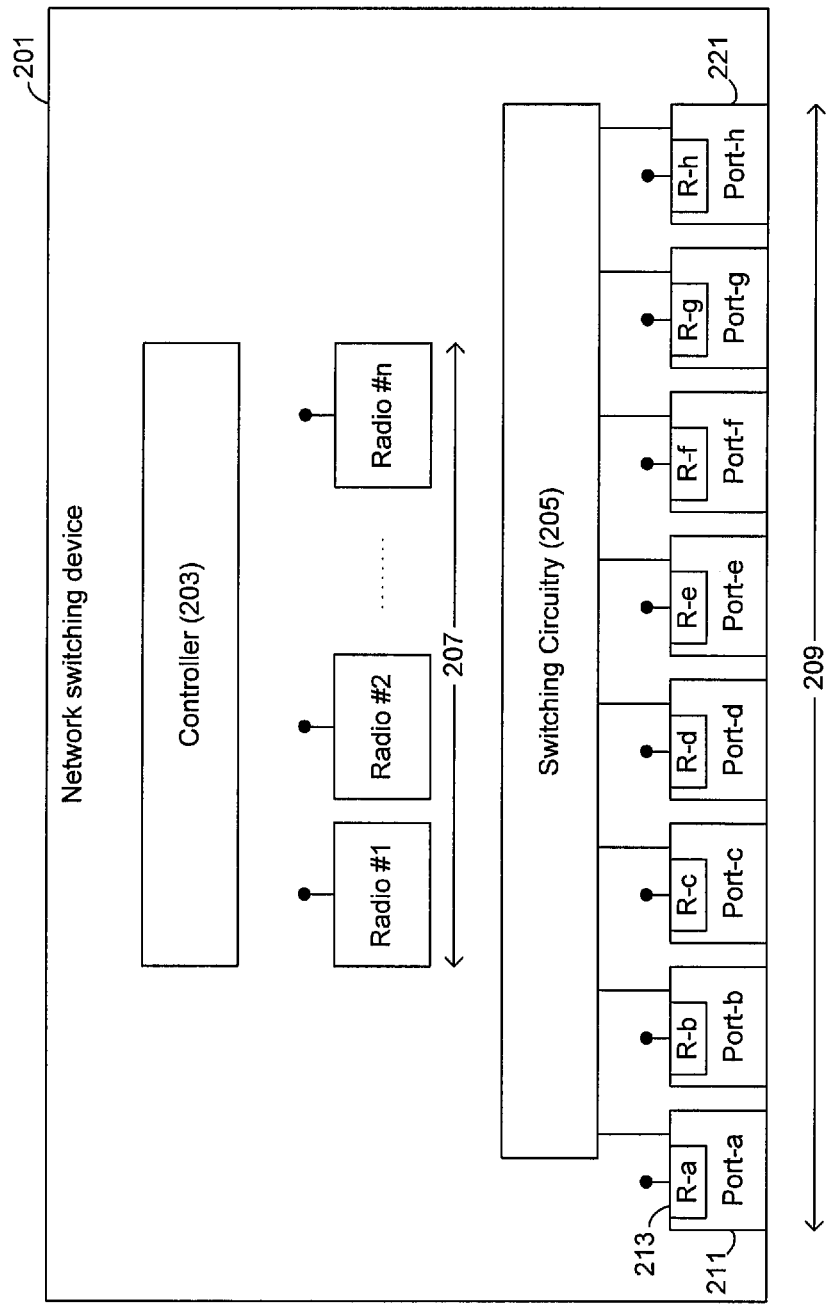
FIG. 2A is a block diagram that illustrates an exemplary network switching device with a switch fabric utilizing wired and wireless intra-connectivity, in accordance with an embodiment of the invention.

FIG. 2A is a block diagram that illustrates an exemplary network switching device with switch fabric utilizing wired and wireless intra-connectivity, in accordance with an embodiment of the invention. Referring to FIG. 2A, there is shown there is shown a network switching device 201, a controller 203, a switching circuitry 205, a plurality of radios 207, and a plurality of ports 209, each of which is similar to or is substantially similar to port-a 211.

The network switching device 201 comprises switch fabric that is operable to enable performing switching operation in a network. The network switching device 201 is substantially similar to the network switching device 101, as described in FIG. 1, and is similarly operable to enable performing switching operations. The network switching device 201, for example, comprises the controller 203, the switching circuitry 205, the plurality of radios 207, the plurality of ports 209, and suitable logic, code, and/or circuitry that enable performing various switching related operations. Unlike the network switching device 101, however, the network switching device 201 also comprises the plurality of radios 207, which is operable to enable wireless intra-connectivity within the network switching device 201. Each of the plurality of radios 207 is comprises of suitable logic, code, and/or circuitry that enable transmission and/or reception of signals based on one or more wireless standards and/or frequency bands. The plurality of radios 207 is operable, for example, to transmit and/or receive short range RF signals in the 60 GHz range. Each of the plurality of radios 207 is also operable, for example, to perform necessary processing of transmitted and/or received signals including, for example, amplifications, filtering, modulation and/or demodulation, and/or up-conversion and/or down-conversion to facilitate wireless communication within the network switching device 201.

The controller 203 is substantially similar to the controller 103, as described with respect to FIG. 1. The controller 203, however, is also operable in the network switching device 201 to enable wireless intra-connectivity within the network switching device 201. The controller 203, for example, is operable to enable control and management of wireless communication within the network switching device 201 by providing control and/or management of the plurality of radios 207 and/or the radios in each of the plurality of ports 209.

The switching circuitry 205 is substantially similar to the switching circuitry 105, as described with respect to FIG. 1. The switching circuitry 205 is similarly utilized in the network switching device 201 to enable transfer of traffic packets between among the plurality of ports 209, to facilitate communication of the traffic between network nodes in a network serviced by the network switching device 201.

The Port-a 211 comprises suitable logic, circuitry and/or code that enable providing external network interfacing functionality, in the network switching device 101, based on one or more networking standards and/or protocols. The Port-a 211 may comprise, for example, a 10/100/1000 Mbps or multigigabit Ethernet port. The Port-a 211 also comprises a dedicated internal port radio, R-a 213, which enables communication between the port-a 211 and other components and/or subsystems within the network switching device 201.

The internal port radio R-a 213 comprises suitable logic, circuitry and/or code that enable transmission and/or reception of signals based on one or more wireless standards and/or frequency bands. The internal port radio R-a 213 may be operable, for example, to transmit and/or receive short range RF signals in the 60 GHz range. The internal port radio R-a 213 is utilized to transmit and/or receive signals internally in the network switching device 201 to facilitate wireless communication within the network switching device 201.

In operation, the network switching device 201 is utilized to perform network switching operations. The network switching device 201 may be integrated, for example, into a local area network (LAN), to enable transfer of traffic packets between network nodes in the LAN, and/or between network nodes and other devices accessible via intermediary networks and/or the Internet. The network switching device 201, which is described with respect to FIG. 1, is operable to enable utilizing wired paths within the network switching device to facilitate switching operations. For example, traffic packets received by the port-a 211, from a sending network node, are communicated to the transmitting port, port-h 221 for example, via the switching circuitry 205. Each of the plurality of ports 209 is operable to process received and/or transmitted traffic packets to enable determining and/or updating addressing information, substantially as described in FIG. 1. The network switching device 201 is also operable to store, generate, and/or maintain, via the controller 203 for example, routing information that maps addressing information to each of the ports in the plurality of ports 209.

The network switching device 201, additionally, is also operable to enable supporting and/or utilizing wireless intra-connectivity during switching operations. The ports' dedicated radios and/or the plurality of radios 207 are operable to enable setting up and utilizing wireless paths to facilitate traffic packet communication between the ports during switching operations. For example, wireless paths may be utilized to enable traffic packet communications between the port-a 211 and the port-h 221 rather than using wired paths via the switching circuitry 205. The port-a 211 and the port-h 221 may communicate traffic packets directly via their respective radios, internal port radios R-a 213 and R-h, and/or indirectly wherein one or more of the plurality of radios 207 are utilized as intermediaries during the wireless communication. The controller 203 is operable to setup, control, and/or manage, via the switching circuitry 205 for example, wireless intra-connectivity in the network switching device 201. For example, where switching operations requires reception of traffic data via the port-a 211 and transmission of the traffic data via the port-h 221, the controller 203 is operable to determine if and/or when to utilize wireless rather than wired paths to facilitate traffic packet communication between the ports. The controller 203 is then operable to instruct port-a 211 and port-h 221, via the switching circuitry 205 for example, to use their respective radios to setup and utilize necessary wireless path(s).

Various factors and/or parameters may be relevant in determination of when and/or how to use wireless intra-connectivity during switching operations. The controller 203 considers, for example, speed, delay, and/or throughput of available wireless and wired paths, and/or quality of service (QoS) requirement of the traffic in determining whether to utilize wireless intra-connectivity. The network switching device 201 may also be programmed to favor one type of paths rather than the other. For example, the network switching device 201 may be setup to utilize wired paths, via the switching circuitry 20, to minimize setup, control, and/or management processing in the network switching device 201 during switching operations. Wireless intra-connectivity may be utilized to facilitate communicating switching overflow whenever the wired switch fabric in the network switching device 201 reaches and/or approaches blocking threshold. Alternatively, the network switching device 201 may be programmed to favor wireless intra-connectivity, and may utilize wired paths when, and to the extent deemed necessary, to mitigate overflow switching issues with wireless intra-connectivity. The network switching device 201 is also operable, for example, to enable arbitration among various traffics switched via the network switching device 201. The network switching device 201 may determine allocation of bandwidth and/or connectivity allocation within network switching device 201, and/or in priority in accessing wired and/or wireless pathway connectivity during switching operations. The arbitration determination may be based, for example, on the QoS requirement of the different traffics switched via the network switching device 201.

In an exemplary aspect of the invention, various design and/or operability techniques are utilized to optimize usability of wireless intra-connectivity in the network switching device 201. For example, the cage utilized to host the network switching device 201 may be designed to protect the internal radios within the network switching device 201 from external interference and/or to limit potential interference that may be caused by the internal radios in the network switching device 201 to surrounding external devices and/or systems. The placement of the internal radios may also be done in a manner that reduces interference between internal radios and/or improve the inter-radio links. For example, the internal radios may be configured in circular placement to reduce separation between each two radios, and to reduce potential interference caused to other internal radios. In additional to physical and/or design techniques, operational techniques, which affect the physical characteristics and/or attributes of the RF and/or communication links, may also be utilized.

Channelization, directionality, and/or collision avoidance techniques are utilized, for example, to reduce interference between the internal radios, and/or to improve speed and throughput of the wireless intra-connectivity within the network switching device 201, via the controller 203 for example. The network switching device 201 may implement, for example, multiple-input and multiple-output (MIMO) based techniques, wherein suitable frequencies bands, including the 60 GHz band for example, beamforming management, and/or RF transmission/reception configurations are utilized to achieve optimal directional spatial multiplexing within the network switching device 201. The network switching device 201 may also enable, via the controller 203 for example, channelization of RF links utilized in establishing wireless pathways within the network switching device 201. Frequency and/or time multiplexing may be utilized, for example, to channelize RF carriers utilized in the network switching device 201 to perform wireless pathway connectivity, wherein the RF carriers can be shared by multiple radios utilizing channels and sub-channels that are implement utilizing frequency modulation and/or time division multiplexing management. Collision avoidance based techniques, including, for example, Carrier Sense Multiple Access With Collision Avoidance (CSMA/CA), may also be utilized to further improve the throughput and reduce interference in the network switching device 201.

Figure 2B:
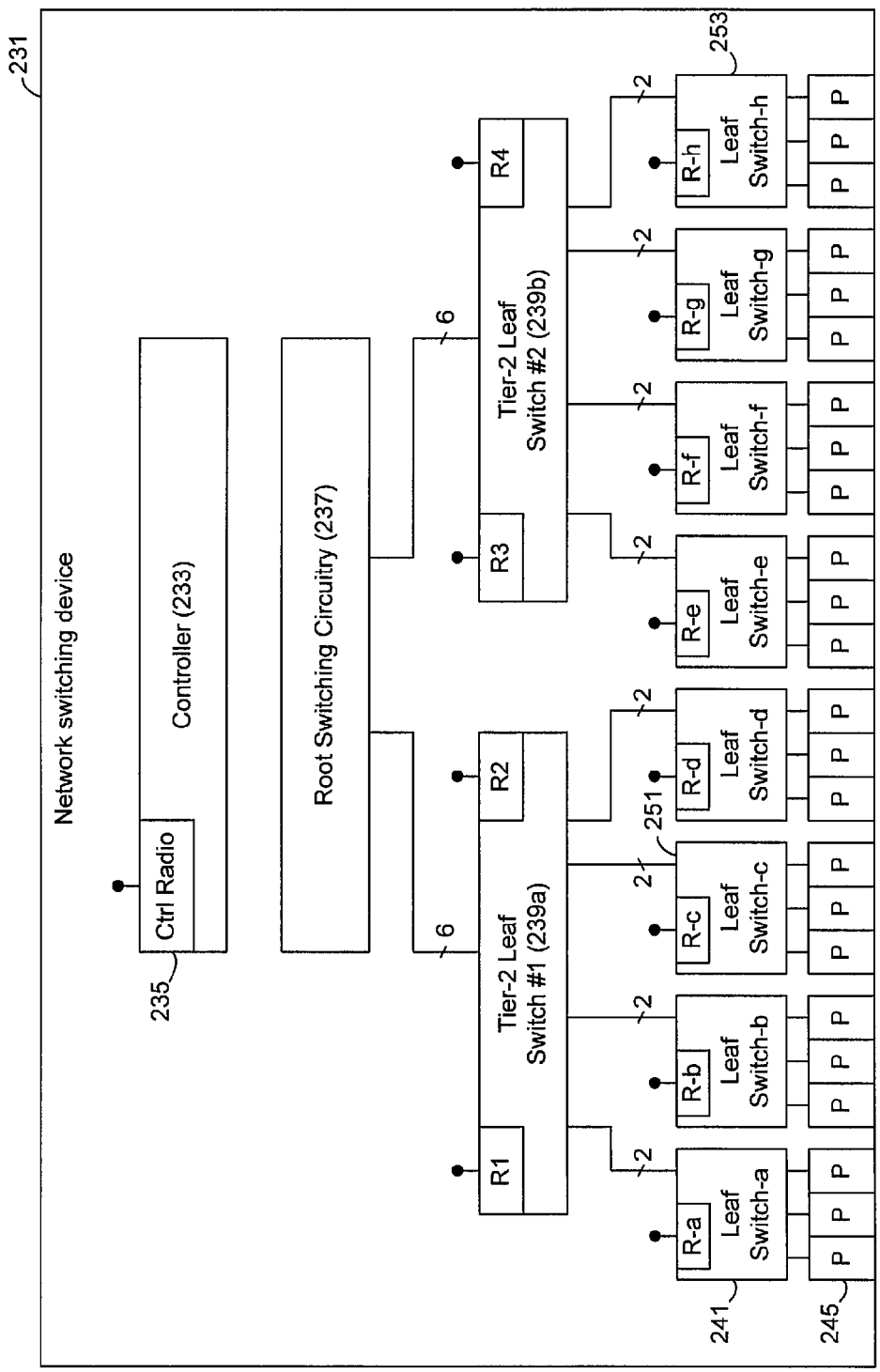
FIG. 2B is a block diagram that illustrates an exemplary network switching device with switch fabric comprising leaf switching and utilizing wired and wireless intra-connectivity, in accordance with an embodiment of the invention.

FIG. 2B is a block diagram that illustrates an exemplary network switching device with switch fabric comprising leaf switching and utilizing wired and wireless intra-connectivity, in accordance with an embodiment of the invention. Referring to FIG. 2B, there is shown network switching device 231, a controller 233, a control radio 235, a root switching circuitry 237, a first tier-2 leaf switch 239a, a second tier-2 leaf switch 239b, and plurality of leaf switches, leaf switch-a 241, . . . , leaf switch-h 253 for example, each substantially similar to leaf switch-a 241.

The network switching device 231 comprises switch fabric that is operable to perform switching operation in a network. The network switching device 231 is substantially similar to the network switching device 201, as described with respect to FIG. 2A, and is similarly operable to enable performing switching operations. The network switching device 231, for example, comprises the controller 233, the root switching circuitry 237, the first and second tier-2 leaf switches 239a and 239b, the plurality of leaf switches, leaf switch-a 241, . . . , leaf switch-h 253, and suitable logic, code, and/or circuitry that enable performing various switching related operations. Similar to the network switching device 201, the network switching device 231 is also operable to enable wireless intra-connectivity within the network switching device 231. The network switching device 231, however, enables multiple-level wireless intra-connectivity, wherein internal radio accessibility at provided at the leaf switch, tier-2 leaf switch and root switch levels. The multiple-level wireless connectivity within the network switching device 231 allows for improved flexibility and scalability, for example, in mixing wired and wireless communication between the ports.

The controller 233 is substantially similar to the controller 203, as described in FIG. 2A. The controller 233, however, is also enabled to utilize wireless intra-connectivity within the network switching device 231 in performing control and management operations. The controller 233 comprises, for example, a dedicated internal radio, control radio 235, which enables communication between the controller 233 and other components and/or subsystems within the network switching device 231. The control radio 235 comprises suitable logic, circuitry and/or code that enable transmission and/or reception of signals based on one or more wireless standards and/or frequency bands. The control radio 235 may be operable, for example, to transmit and/or receive short range RF signals in the 60 GHz range. The control radio 235 is utilized to transmit and/or receive control and/or management related messaging internally within the network switching device 231.

The root switching circuitry 237 is substantially similar to the switching circuitry 205, as described in FIG. 2A. The root switching circuitry 237, however, is operable to enable servicing the first and second tier-2 leaf switches 239a and 239b. The root switching circuitry 237 is utilized, for example, to enable transfer of traffic packets between the first and second tier-2 leaf switches 239a and 239b, to facilitate communicating of the traffic data between network nodes in a network serviced by the network switching device 231.

Each of the first and second tier-2 leaf switches 239a and 239b comprises suitable logic, code, and/or circuitry that enable are operable to service a subset of the plurality of leaf switches, leaf switch-a 241, . . . , leaf switch-h 253. The first tier-2 leaf switch 239a, for example, is operable to directly service half the leaf switches, leaf switch-a 241, . . . , leaf switch-d, while the second tier-2 leaf switch 239b is operable to directly service the remaining half the leaf switches, leaf switch-e, . . . , leaf switch-h 253. Each of he first and second tier-2 leaf switches 239a and 239b is utilized, for example, to enable transfer of traffic packets directly between the leaf switches serviced by the tier-2 leaf switch, and/or to enable transfer of traffic packets, via the root switching circuitry 237 for example, from and/or to leaf switches serviced by the other tier-2 leaf switch. In an exemplary aspect of the invention, each of the first and second tier-2 leaf switches 239a and 239b also comprises radios, dedicated radios R1, R2, R3, and R4, to enable wireless communication within the network switching device 231 during traffic data communications and/or control/management operations.

The leaf switch-a 241 comprises suitable logic, circuitry and/or code operable to service a plurality of routing ports, enabling transfer of traffic packets from and/or to the ports. For example, leaf switch-a 241 in the network switching device 231 is operable to service a plurality of instances of the port 245. The port 245 is substantially similar to the port 111, and comprises suitable logic, circuitry and/or code that enable external network interfacing functionality, in the network switching device 231, based on one or more networking standards and/or protocols. The port 245 may comprise, for example, a 10/100/1000 Mbps or multigigabit Ethernet port. Leaf switch-a 241 also comprises a dedicated internal leaf switch radio, R-a 243, which enables communication between leaf switch-a 241 and other components and/or subsystems within the network switching device 231. The internal leaf switch radio R-a 243 is substantially similar to the internal port radio R-a 201, as described with respect to FIG. 1A, and is operable, for example, to transmit and/or receive short range RF signals to facilitate wireless communication within the network switching device 231.

In operation, the network switching device 231 is operable substantially similar to the network switching device 201, as described in FIG. 2A. Similar to the network switching device 201, the network switching device 231 is utilized to perform network switching operations. The network switching device 231 may be integrated, for example, into a network, to enable transfer of traffic packets between network nodes within the network, and/or between network nodes and other entities accessible via intermediary networks and/or the Internet. The switching operations are performed, within the network switching device 231, via wired and/or wireless paths, substantially as described with respect to FIG. 2A. The network switching device 231, however, utilized multiple level of connectivity to improve flexibility in setting up of wired and/or wireless pathways, and/or in mixing up use of wired and wireless pathways during switching operations.

In an exemplary embodiment of the invention, each leaf switch such as the leaf switch-a 241 in the network switching device 231, is configured to service 3 ports. The leaf switch-a 241 utilizes 2-link wired path to communicate with the first teir-2 leaf switch 239a. The Leaf switch-a 241 utilizes the internal leaf switch radio R-a 243 to establish wireless pathway to other components in the network switching device 231. Each of the teir-2 leaf switches 269a and 269b utilize a 6-link wired path to communicate with the root switching circuitry 237. The teir-2 leaf switches 269a and 269b are operable to utilize their dedicated radios R1, R2, R3, and R4 to establish wireless pathway to other components in the network switching device 231. During switching operations, traffic packets communicated between ports serviced by the same leaf switch, for example leaf switch-a 241, are switched at the leaf switch level. Traffic packets communicated between ports serviced by the leaf switches that are in turn serviced by the same tier-2 leaf switch may be wire-switched at the tier-2 leaf switch level. For example, where traffic packets need be communicated between port 245 in the leaf switch-a 241 and one of the ports in the leaf switch-c 251, a wired pathway may be setup via the leaf switch-a 241, the 2-link wired path between the leaf switch-a 241 and the first teir-2 leaf switch 269a, the first teir-2 leaf switch 269a, the 2-link wired path between the first teir-2 leaf switch 269a and the leaf switch-c 251, and the leaf switch-c 251. In instances where traffic packets need to be communicated between the port 245 in the leaf switch-a 241 and one of the ports in the leaf switch-h 253, a wired pathway may be setup via the leaf switch-a 241, the 2-link wired path between the leaf switch-a 241 and the first teir-2 leaf switch 269a, the first teir-2 leaf switch 269a, the 6-link wired path between the first teir-2 leaf switch 269a and the root switching circuitry 237, the root switching circuitry 237, the 6-link wired path between the root switching circuitry 237 and the second teir-2 leaf switch 269b, the second teir-2 leaf switch 269b, the 2-link wired path between the second teir-2 leaf switch 269b and leaf switch-h 253, and leaf switch-h 253. Wireless intra-connectivity is utilized, for example, to supplement and/or to substitute for the wired connectivity. For example, in instances where traffic packets need be communicated between the port 245 in the leaf switch-a 241 and one of the ports in the leaf switch-h 253, the leaf switch-a 241 may utilize internal leaf switch radio R-a 243, to communicate with the first teir-2 leaf switches 269a. The first teir-2 leaf switch 269a may then communicate with the second teir-2 leaf switch 269b either via wired pathway, via the root switching circuitry 237, and/or wirelessly via dedicated radios R1 and/or R2. The leaf switch-a 241 may also utilize internal leaf switch radio R-a 243 to communicate directly one or more of the other leaf switches, for example the leaf switch-c 251 and/or the leaf switch-h 253.

The network switching device 231, similar to the network switching device 201, enables use of various design and/or operability techniques as described in FIG. 2A to further improve effectiveness of RF pathway configurations and management when using wireless intra-connectivity to perform switching operations within the network switching device 231.

Figure 2C:
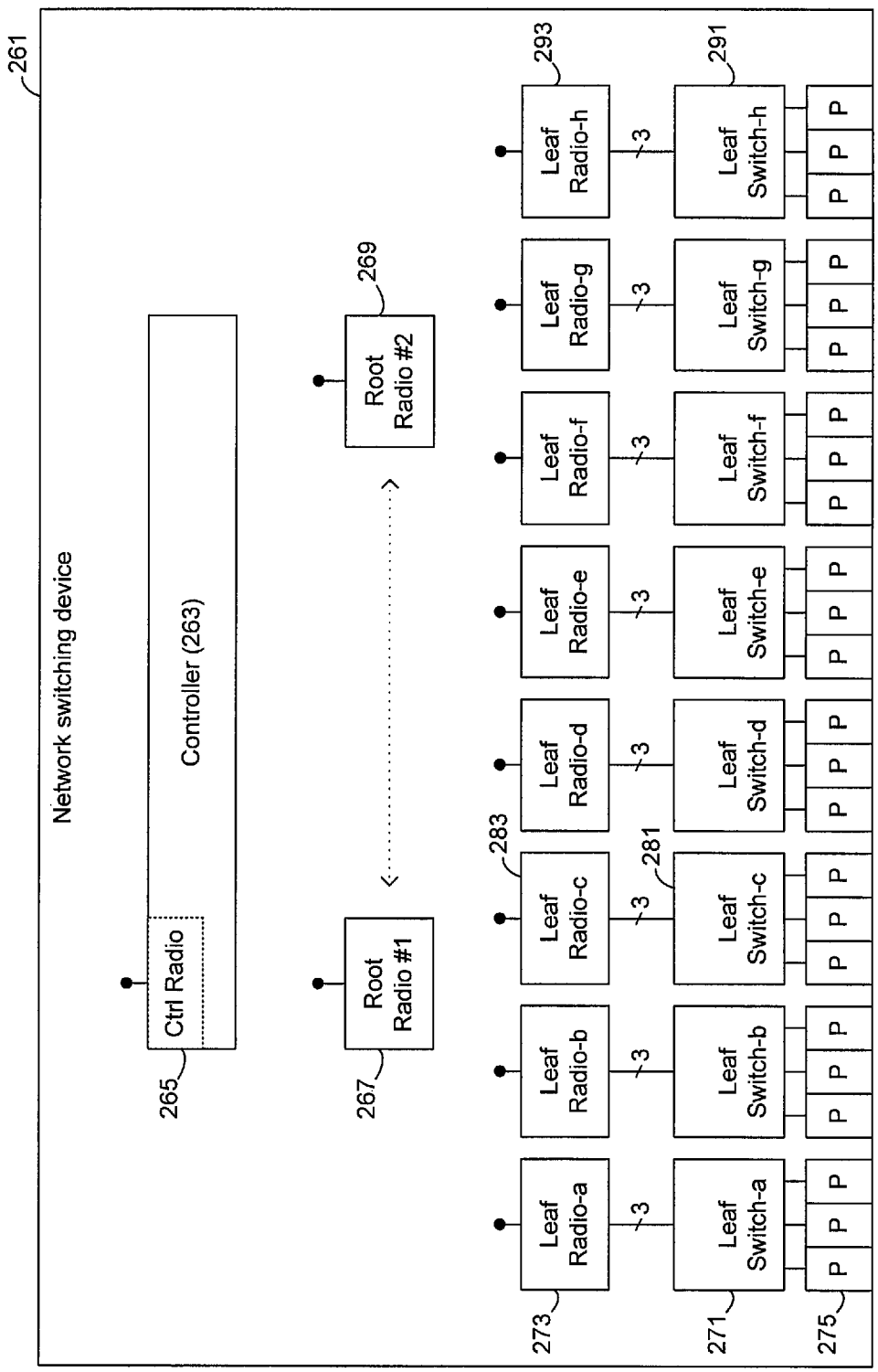
FIG. 2C is a block diagram that illustrates an exemplary network switching device with switch fabric comprising leaf switching and utilizing only wireless intra-connectivity, in accordance with an embodiment of the invention.

FIG. 2C is a block diagram that illustrates an exemplary network switching device with switch fabric comprising leaf switching and utilizing only wireless intra-connectivity, in accordance with an embodiment of the invention. Referring to FIG. 2C, there is shown network switching device 261, a controller 263, a control radio 265, a root switching circuitry 267, a first root radio 267, a second root radio 269, a plurality of leaf switches, a leaf switch-a 271, . . . , a leaf switch-h 291, each substantially similar to leaf switch-a 271, and a plurality of leaf radios, leaf radio-a 273, . . . , leaf radio-h 293, each of which is substantially similar to the leaf radio-a 273.

The network switching device 261 comprises switch fabric that is operable to enable switching in a network. The network switching device 261 is substantially similar to the network switching device 231, as described with respect to FIG. 2B, and is similarly operable to enable performing switching operations. The network switching device 261, for example, comprises the controller 263, the first root radio 267, the second root radio 269, the plurality of leaf switches, leaf switch-a 271, . . . , leaf switch-h 291, the plurality of leaf radios, leaf radio-a 273, . . . , leaf radio-h 293, and suitable logic, code, and/or circuitry that enable performing various switching related operations. Similar to the network switching device 231, the network switching device 261 is also operable to enable wireless intra-connectivity. The network switching device 261, however, utilizes wireless intra-connectivity to enable communication between ports corresponding to different leaf switches.

The controller 263 is substantially similar to the controller 233, as described with respect to FIG. 2B. The controller 263 is similarly enabled to utilize wireless intra-connectivity within the network switching device 261 in performing control and management operations. The controller 263 comprises, for example, the control radio 265 to enable communication between the controller 263 and other components and/or subsystems within the network switching device 261. The control radio 265 is substantially similar to the control radio 235, as described with respect to FIG. 2B.

Each of the root radios 267 and 269 is comprises suitable logic, code, and/or circuitry that enable transmission and/or reception of signals based on one or more wireless standards and/or frequency bands. The root radios 267 and 269 are utilized, for example, to facilitate communication of the traffic packets between ports in the network switching device 261. The root radios 267 and 269 are operable, for example, to transmit and/or receive short range RF signals in the 60 GHz range. Each of the root radios 267 and 269 is also operable, for example, to service a subset of the plurality of leaf radios, leaf radio-a 273, . . . , leaf radio-h 293. The first root radio 267, for example, is operable to service half the leaf radios, leaf radio-a 273, . . . , leaf radio-d, while the second root radio 269 is operable to directly service the remaining half the leaf radios, leaf radio-e, . . . , leaf radio-h 293. Each of THE first and second root radio 269 and 269 is utilized, where necessary, to enable transfer of traffic packets between leaf radios serviced by the root radio, and/or to enable communication of traffic packets, wirelessly via the other root radio, from and/or to leaf switches serviced by the other root radio.

Leaf switch-a 271 comprises suitable logic, circuitry and/or code that enable servicing a plurality of routing ports, enabling transfer of traffic packets from and/or to the ports. In an exemplary embodiment of the invention, the leaf switch-a 271 is operable in the network switching device 261 to service 3 instances of the port 275. The port 275 is substantially similar to the port 111, and comprises suitable logic, circuitry and/or code that enable external network interfacing functionality, in the network switching device 261, based on one or more networking standards and/or protocols. The port 275 may comprise, for example, a 10/100/1000 Mbps or multigigabit Ethernet port. Leaf switch-a 271 is enabled to communicate wirelessly with other components and/or subsystems within the network switching device 261 via the leaf radio-a 273. The leaf radio-a 273 is comprises suitable logic, code, and/or circuitry that enable transmission and/or reception of signals based on one or more wireless standards and/or frequency bands, to facilitate communication of the traffic packets between ports in the network switching device 261.

The network switching device 261 operates substantially similar to the network switching devices 201 and 231, as described with respect to, for example, FIGS. 2A and 2B. The network switching device 261, however, utilizes solely wireless intra-connectivity in communicating traffic packet between ports serviced by different leaf switches. For example, where traffic packets need be communicated between port 275 in the leaf switch-a 271 and one of the ports in the leaf switch-c 281, the leaf switch-a 271 may utilize the leaf radio-a 273 to communicate with the leaf radio-c 283 to facilitate traffic packet communication. The first root radio 267 and the second root radio 269 are operable to enable wireless pathway accessibility where the leaf switches are inoperable to communicate directly via their respective leaf radios. For example, where traffic packets need be communicated between port 275 in the leaf switch-a 271 and one of the ports in the leaf switch-h 291, the leaf switch-a 271 may utilize the leaf radio-a 273 to communicate with the first root radio 267, which communicates the traffic packets to the second root radio 269. The second root radio 269 then communicates the traffic packets to the leaf radio-h 293. The network switching device 261, similar to the network switching devices 201 and 231, enables use of various design and/or operability techniques as described with respect to, for example, FIG. 2A to further improve effectiveness of RF pathway configurations and management when using wireless intra-connectivity to perform switching operations within the network switching device 261.

Figure 3:
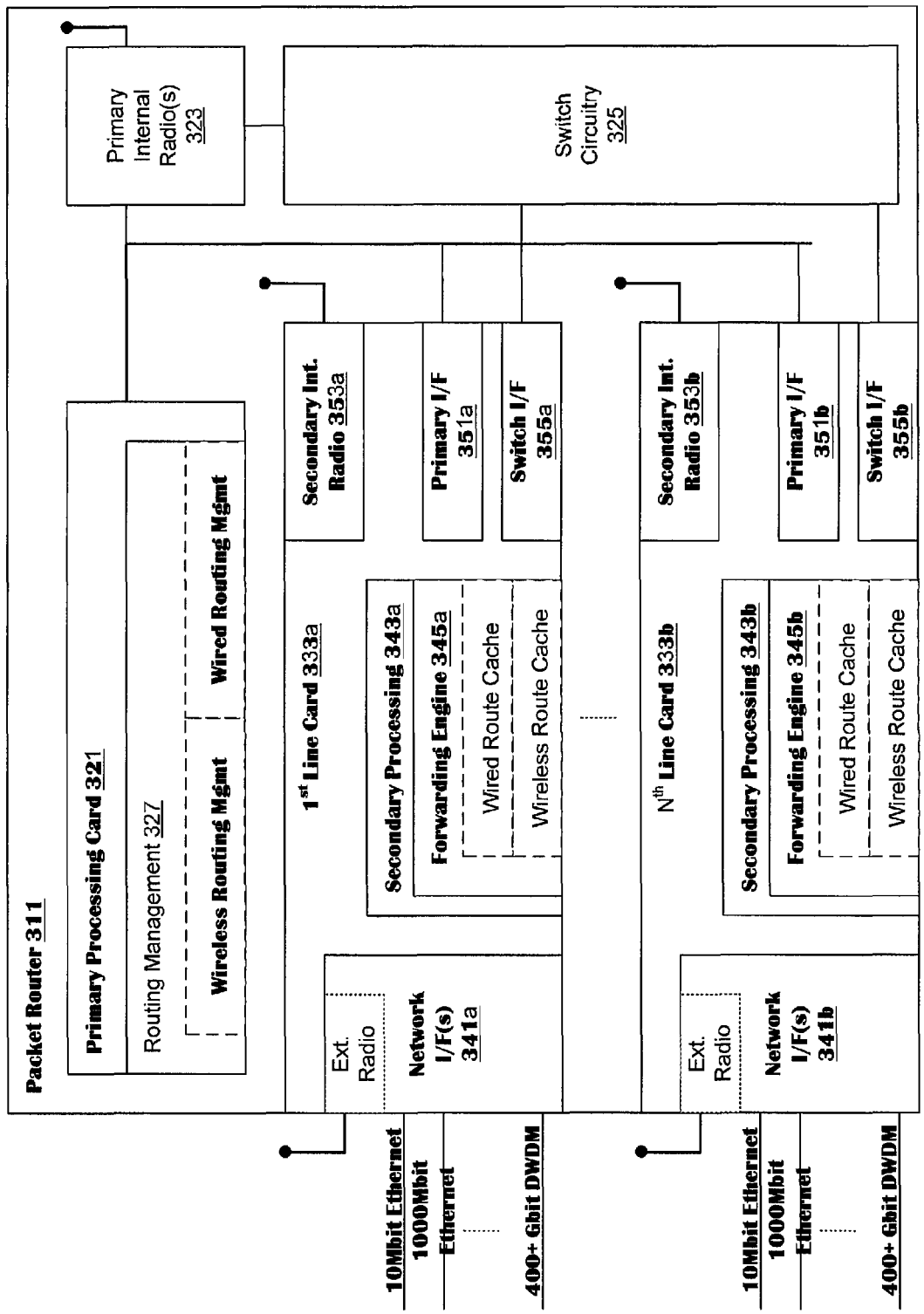
FIG. 3 is a block diagram that illustrates an exemplary packet router with a switch fabric comprising a plurality of line cards, which supports wireless intra-connectivity, in accordance with an embodiment of the invention.
Figure 4:
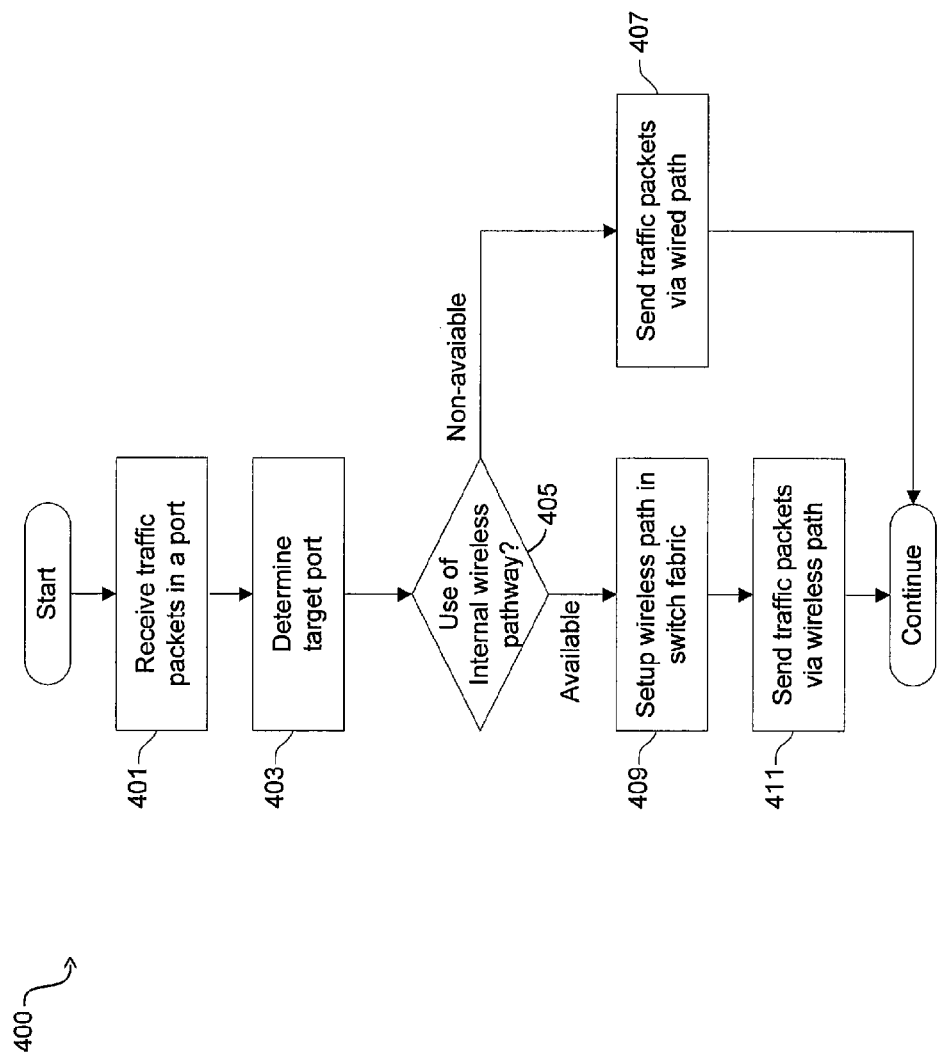
FIG. 4 is a flow chart that illustrates utilization of wireless intra-connectivity in a switch fabric, in accordance with an embodiment of the invention.

FIG. 3 is a block diagram that illustrates an exemplary packet router with a switch fabric comprising a plurality of line cards, which supports wireless intra-connectivity, in accordance with an embodiment of the invention. Referring to FIG. 4, there is shown a packet router 311, a primary processing card 321, a primary internal radio subsystem 323, a switch circuitry 325, and a plurality of line cards 333*a*, . . . , 333*b*.

The packet router 311 comprises the primary processing card 321, the primary internal radio subsystem 323, the switch circuitry 325, the plurality of line cards 333*a*, . . . , 333*b*, and suitable logic, circuitry and/or code that enable network switching while utilizing wireless connectivity within the packet router 311 during switching operations. The packet router 311 is operable to enable utilizing internal radios and/or wireless interfaces to enable implementing and/or using wireless intra-connectivity during switching operations, substantially similar to network switching devices 201, 231, and/or 261, as described with respect to FIGS. 2A, 2B, and/or 2C.

The primary processing card 321 comprises suitable logic, circuitry and/or code that enable providing overall processing, control and management operations in the packet router 311. The primary processing card 321 comprises, for example, routing management 327, which is operable to specifically manage packet routing operations to facilitate packet switching via the packet router 311. The routing management 327 comprises wireless and wired routing management functionalities, which are operable to enable setting up and/or configuring wireless and wired pathway connectivity within the packet router 311.

The primary internal radio subsystem 323 comprises suitable logic, circuitry and/or code that enable transmission and/or reception of wireless signals within packet router 311. The primary internal radio subsystem 323 is operable, for example, to enable wireless communication with one or more of the plurality of line cards, 333*a*, . . . , 333*b*, to enable control and/or management of the plurality of line cards, by the primary processing card 321 for example, and/or to route traffic packets between them when wireless pathway connectivity is utilized during switching operations.

The switch circuitry 325 comprises suitable logic, circuitry and/or code that enable packet routing between the line cards in the packet router 311. In an embodiment of the invention, the switch circuitry 325 operates substantially similar to the switch circuitry 205, as described in FIG. 2A. The switch circuitry 325 also enables, when used in conjunction with the primary internal radio subsystem 323, implementing the operations performed by root switch circuitry 237 and the first and second teir-2 leaf switches 239*a* and 239*b*, as described as described with respect to. FIG. 2B.

Each of the line cards is substantially similar to the first line card 333*a*. The first line card 333*a* comprises network interface subsystem 341*a*, secondary processing subsystem 343*a*, primary interface 351*a*, secondary internal radio 353*a*, and switch interface 355*a*, and suitable logic, circuitry and/or code that enable reception and/or transmission of traffic data routed via the packet router 311. The network interface subsystem 341*a* is operable to physically provide network interfacing functionality in the first line card 333*a* based on one or more wired standard, including, for example, 10/100/1000 Mbit Ethernet, multigigabit Ethernet, and/or the 400+ Gbit Dense Wavelength Division Multiplexing (DWDM). The network interface subsystem 341a is also operable to enable external wireless accessibility via external radio. The network interface 341a is utilized, for example, to enable external communication of traffic data that is switched via the packet router 311. The secondary processing subsystem 343a enables performing various processing and/or control operations within the line card. The secondary processing subsystem 343a comprises, for example, a forwarding engine 345a that is operable to manage packet forwarding via the first line card 333a. The forwarding engine 345a comprises, for example, wireless and/or wired caches that enable storage and/or maintenance of wired and/or wireless pathway forwarding information relevant to packets received and/or transmitted via the first line card 333a. The information in the wired and/or wireless caches may be received from the primary processing card 321, and is supplemented, updated, and/or replaced during packet routing operations in the first line card 333a. Wired and/or wireless routing updates during the operations of the first line card 333a may then be communicated to the primary processing card to enable updating wireless and/or wired routing information in the routing management 327, in instances where necessary. The primary interface 351a is operable to enable interactions with the first line card 333a, by the primary processing card 321 for example, during management and/or control operations in the packet router 311. The first line card 333a is operable to utilize the switch circuitry 325, via the switch interface 353a to facilitate wired packet switching. Alternatively, the first line card 333a is operable to perform packet routing wirelessly within the packet router 311, via the secondary internal radio 353a. The traffic packets may be communicated wirelessly directly to another line card, for example to the $N^{th}$ line card 333b via its corresponding secondary internal radio 353b. Alternatively, the traffic packets may be communicated indirectly via the primary internal radio subsystem 323.

FIG. 4 is a flow chart that illustrates utilization of wireless intra-connectivity in a switch fabric, in accordance with an embodiment of the invention. Referring to FIG. 4, there is shown a flow chart 400 comprising a plurality of exemplary steps, which may enable wireless intra-connectivity in switch fabric.

In step 401, traffic packets are received in a port in a network switching device. For example, the traffic packets may be received in packet router 311, in the first line card 333a via the network interface 341a. In step 403, the target port, within the network switching device, is determined. For example, once packets are received in the first line card 333a, they are processed via the secondary processing 343a. The processing of traffic packets comprises, for example, determining destination addressing information that is written in the packets' headers. The forwarding engine 345a and/or the routing management 327 in the primary processing card 321, accessible via the primary interface 351a, are utilized to determine the corresponding port and/or line card based on the destination information. In step 405, availability of use of internal wireless pathway within the network switching device is available is determined. The availability of the internal wireless pathway is based on various exemplary factors. The network switching device is configured to enable wireless intra-connectivity. Where the network switching device enables wireless intra-connectivity, arbitration and/or availability of RF and/or channels are factors that determine the availability and/or selection of an internal wireless path. In instances, where use of internal wireless paths is unavailable, the exemplary steps proceed to step 407.

In step 407, the traffic packets are communicated via the wired path. For example, traffic packets received via the first line card 333a are communicated to the $N^{th}$ line card 333b via the switch interface 355a, the switch circuitry 325, and the switch interface 355b.

Returning to step 405, in instances, where internal wireless paths are available, the exemplary steps proceed to step 409. In step 409, AN internal wireless path is setup. For example, A wireless path between the first line card 333a and the Nth line card 33b is setup and/or established directly between the secondary internal radio 353a and the secondary internal radio 353b, or indirectly via the secondary internal radio 353a, the primary internal radio subsystem 323, and the secondary internal radio 353b. In step 411, the traffic packets are communication via established wireless path.

Various embodiments of the invention may comprise a method and system for switch fabric with wireless intra-connectivity. The packet router 311 is operable to enable wireless intra-connectivity within its switch fabric, via the primary internal radio subsystem 323 and secondary internal radios in each of the plurality of line cards 333a, ..., 333b. The wireless intra-connectivity is utilized to service switching operations in the packet router 311, via wired and/or wireless links. The wireless intra-connectivity is operable to enable performing management and/or control operations wirelessly within the network switching device. The wireless intra-connectivity may be utilized to supplement and/or substitute for use of wired pathways during packet switching. This may prevent and/or reduce blocking in the network switching device. Operations of the internal radios are managed to mitigate and/or limit interference among said one or more internal radios and to optimize throughput available via the wireless intra-connectivity. Management of wireless intra-connectivity and/or the internal radios comprises arbitration, channelization, time division multiplexing, and/or directional processing techniques such as beamforming. One or more radios that are internal to or external to the network switching device are operable to enable cascading plurality of network switching devices that support wireless intra-connectivity to further improve switching operations.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for switch fabric with wireless intra-connectivity.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
    within a switch fabric of a network switching device, wherein the switch fabric comprises a plurality of communication cards, wherein each communication card comprises:
        an external interface component that is operable to communicate packets external to said switching device;
        a wired internal interface component that is operable to communicate data from and/or to said each communication card within said switching device over wired connection; and
        a wireless internal interface component that is operable to communicate data from and/or to said each communication card within said switching device over a wireless connection;
    the method comprising:
    selectively communicating information, or data, or both, between two or more communications ports within said network switching device via one or more wireless internal interfaces within said network switching device; and
    selectively communicating at least some of the information, or the data, or both, instead via one or more switchable wired interfaces in said network switching device;
    wherein one or more wired interfaces in said network switching device are bypassed and the information, or data, or both, are communicated through said one or more wireless interfaces;
    wherein a determination to communicate the information, or data, or both through the wireless interfaces is based on factors comprising: available communication speed, available bandwidth, or quality of service (QoS).

2. The method according to claim 1, comprising controlling communication of the information or data, or both, between two or more communication ports using the one or more wireless radios the one or more wireless interfaces or the switchable wired links of said network switching device based on factors comprising available communication speed, available bandwidth, and/or quality of service (QoS).

3. The method according to claim 1, comprising routing via said one or more wireless radios or said one or more wireless interfaces within said network switching device, overflow traffic in said network switching device.

4. The method according to claim 1, comprising routing via said one or more wireless radios or said one or more wireless interfaces within said network switching device, overflow traffic when blocking occurs in one or more wired links of said network switching device.

5. The method according to claim 1, comprising managing said one or more wireless radios or said one or more wireless interfaces within said network switching device to mitigate interference for said one or more wireless radios.

6. The method according to claim 5, wherein said management utilizes arbitration, channelization, time multiplexing, or directional communication.

7. The method according to claim 1, comprising controlling operations of entities within said network switching device via said one or more wireless radios or said one or more wireless interfaces within said network switching device.

8. A network switching device comprising:
    a plurality of ports configured for communication of information, or data, or both, with devices external to the network switching device; and
    a switch fabric including one or more wireless interfaces operable to switch information, or data, or both, between respective ports of the plurality of ports within said network switching device;
    wherein the switch fabric comprises a plurality of communication cards, wherein each communication card comprises:
        an external interface component that is operable to communicate packets external to said switching device;
        a wired internal interface component that is operable to communicate data from and/or to said each communication card within said switching device over wired connection; and
        a wireless internal interface component that is operable to communicate data from and/or to said each communication card within said switching device over a wireless connection;
    the switching device selectively communicating information, or data, or both, between two or more communications ports within said network switching device via one or more wireless internal interfaces within said network switching device; and
    selectively communicating at least some of the information, or the data, or both, instead via one or more switchable wired interfaces in said network switching device;
    wherein one or more wired interfaces in said network switching device are bypassed and the information, or data, or both, are communicated through said one or more wireless interfaces;
    wherein a determination to communicate the information, or data, or both through the wireless interfaces is based on factors comprising: available communication speed, available bandwidth, or quality of service (QoS).

9. The network switching device according to claim 8, further comprising one or more circuits operable to combine one or more wired links in said network switching device with said one or more wireless radios or said one or more wireless interfaces within said network switching device to communicate information data or both between the respective ports within said network switching device.

10. The network switching device according to claim 8, further comprising one or more circuits operable to control communication of information and/or data between two or more selected ports of the plurality of ports of said network switching device based on factors comprising available communication speed, available bandwidth, or quality of service (QoS).

11. The network switching device according to claim 8, further comprising one or more circuits operable to route via said one or more wireless radios or said one or more wireless interfaces, or both, within said network switching device, overflow traffic in said network switching device.

12. The network switching device according to claim 8, further comprising one or more circuits operable to route via said one or more wireless radios or said one or more wireless interfaces, or both, within said network switching device, overflow traffic when blocking occurs in one or more wired links of said network switching device.

13. The network switching device according to claim 8, further comprising one or more circuits operable to manage said one or more wireless radios or said one or more wireless interfaces within said network switching device to mitigate interference for said one or more wireless radios.

14. The network switching device according to claim 13, wherein said management utilizes arbitration, channelization, time multiplexing, and/or directional communication.

15. The network switching device according to claim 8, wherein said one or more circuits are operable to control operations of entities within said network switching device via said one or more wireless radios and/or said one or more wireless interfaces within said network switching device.

16. A system, comprising:
a primary processing component that is operable to perform overall processing, control and management functions in a switching device;
a primary internal radio component that is operable to communicate wirelessly with at least some components of said switching device;
a switching component that is operable to provide wired communication of data within said switching device; and
a plurality of communication cards, wherein each communication card comprises:
an external interface component that is operable to communicate packets external to said switching device;
an secondary processing component that is operable to control at least a portion of handling of packets communicated via said communication card, wherein said control is configured based on information provided by said primary processing component, and said handing comprises routing of said packets within said switching device;
a wired internal interface component that is operable to communicate data from and/or to said each communication card within said switching device over wired connection; and
a wireless internal interface component that is operable to communicate data from and/or to said each communication card within said switching device over a wireless connection,
wherein the system is configured to route within said switching device packets received by a first of said plurality of communication cards via said external interface component of said first of said plurality of communication cards to a second of said plurality of communication cards for transmission via said external interface component of said second of said plurality of communication cards, wherein said routing comprises wireless communication of said packets within said switching devices using said primary internal radio component, said wireless internal interface component of said first of said plurality of communication cards, and/or said wireless internal interface component of said second of said plurality of communication cards.

* * * * *